United States Patent [19]

Owen et al.

[11] Patent Number: 4,828,225
[45] Date of Patent: May 9, 1989

[54] POWER CABLE RETRIEVER

[75] Inventors: William Owen, Canyon Lake; Robert Bell, Hawthorne; Douglas Chase, Redondo Beach; Leonard Briese, Rancho, all of Calif.

[73] Assignee: Wyle Laboratories, El Segundo, Calif.

[21] Appl. No.: 941,757

[22] Filed: Dec. 15, 1986

[51] Int. Cl.$^4$ .................... B66D 3/00; H02G 11/00
[52] U.S. Cl. .................... 254/382; 191/12 R; 226/193; 254/374
[58] Field of Search ............ 254/333, 371, 374, 382, 254/134.3 SC, 134.3 R, 395; 226/190, 193; 242/155 R; 191/12.2 A, 12 R, 12.2 R

[56] References Cited

U.S. PATENT DOCUMENTS

| Re. 30,591 | 4/1981 | Newell | 254/134.3 FT |
|---|---|---|---|
| 2,326,671 | 8/1943 | Patterson, Jr. | 254/DIG. 11 |
| 2,483,760 | 10/1949 | Duncan | 254/395 |
| 2,714,494 | 8/1955 | Wentz | 242/155 R |
| 2,802,366 | 8/1957 | Borner | 74/230.5 |
| 2,871,502 | 2/1959 | Whisnant | 242/155 R X |
| 2,947,516 | 8/1960 | Jackson | 254/333 |
| 2,996,231 | 8/1961 | Gretter | 254/134.3 SC |
| 3,078,074 | 2/1963 | Benedict | 254/333 |
| 3,319,293 | 5/1967 | Gollos | 226/190 X |
| 3,343,809 | 9/1967 | Newell | 254/134.3 FT |
| 3,765,614 | 10/1973 | Bartl et al. | 242/47 |
| 3,934,482 | 1/1976 | Byers | 74/230.7 |
| 4,205,871 | 6/1980 | Manabe et al. | 294/82 R |
| 4,230,306 | 10/1980 | Porter | 254/371 |
| 4,234,164 | 11/1980 | Ruark | 254/371 |
| 4,402,488 | 9/1983 | Berkovitz | 254/371 |
| 4,415,140 | 11/1983 | Deering | 254/371 |
| 4,441,692 | 4/1984 | Kovaleski | 254/390 |
| 4,692,569 | 9/1987 | Winner | 254/382 |

Primary Examiner—Stanley N. Gilreath
Assistant Examiner—Katherine Matecki
Attorney, Agent, or Firm—Freilich, Hornbaker, Rosen & Fernandez

[57] ABSTRACT

An apparatus is provided for use at an airport for drawing in and paying out an electric cable, which reliably grips the cable even when it is covered with a slippery anti-freeze fluid used at airports. The apparatus includes a motor-driven traction wheel against which the cable is pressed, with the periphery of the wheel being concave and having a radius of curvature about the same as the cable so the cable can closely nest in it. The wheel has closely spaced treads that press through fluid on the cable to grip it, and has a circumferentially extending groove through which fluid can drain. The cable is pressed against the wheel by rollers that have concave peripheries to also closely surround the cable.

6 Claims, 2 Drawing Sheets

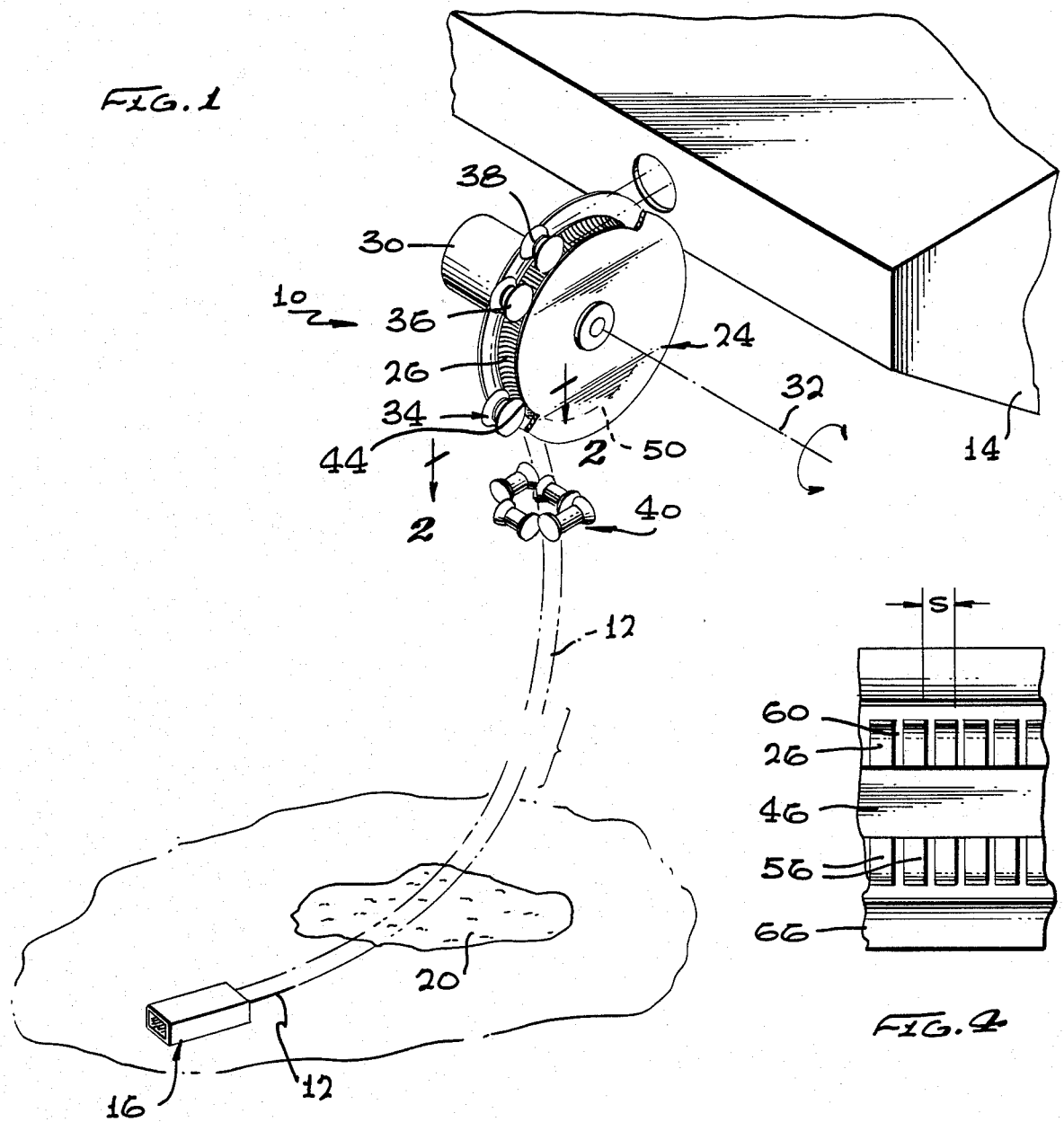
FIG. 1
FIG. 4
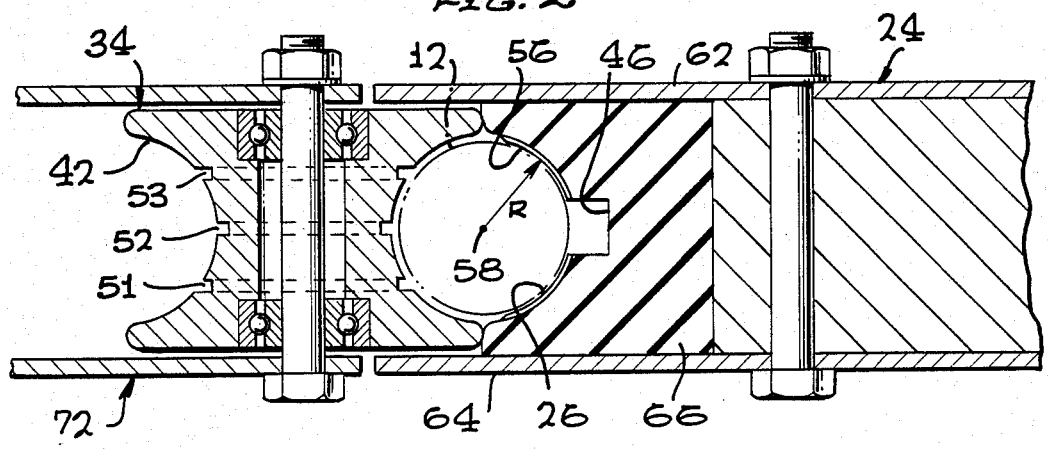
FIG. 2

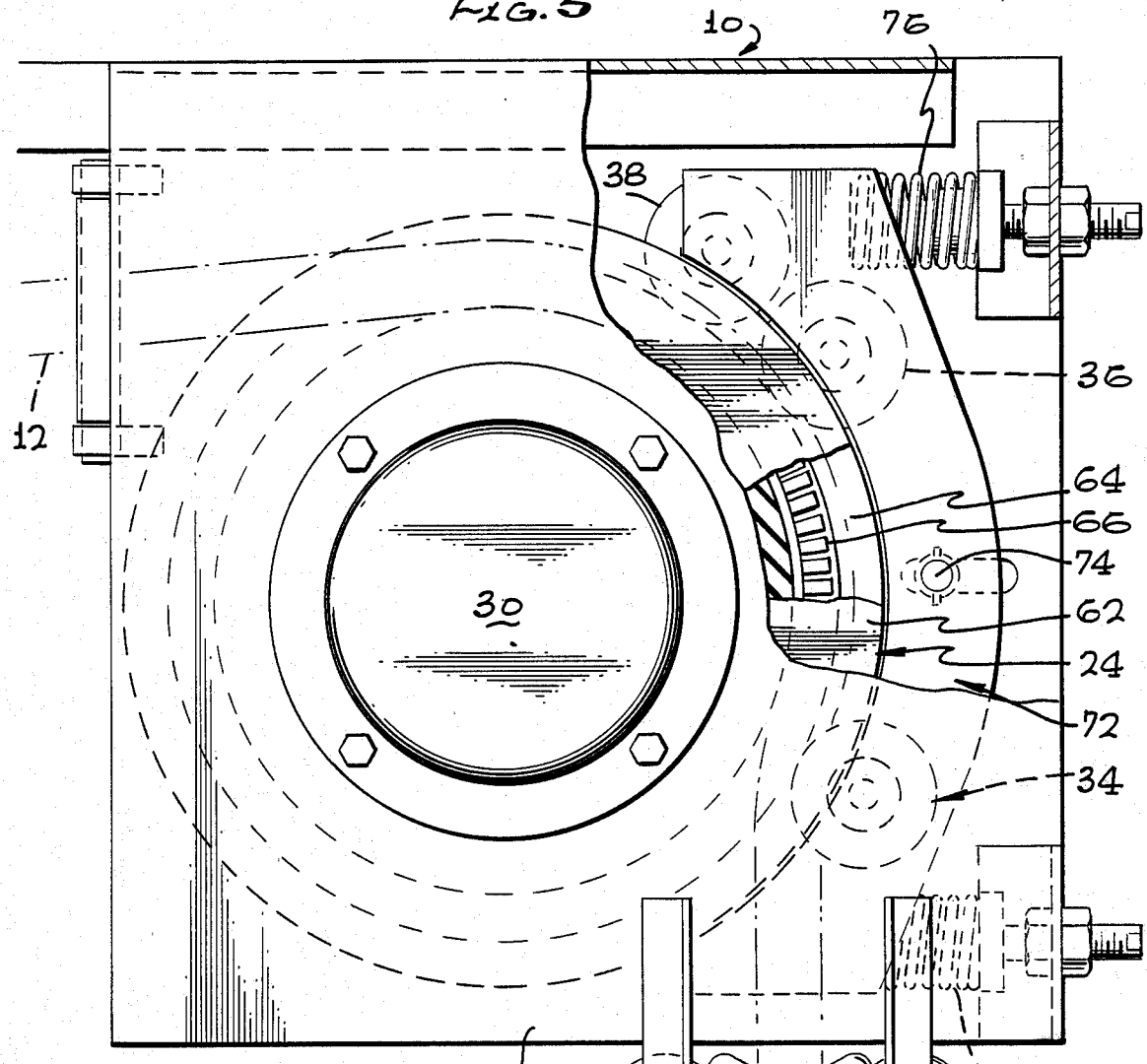
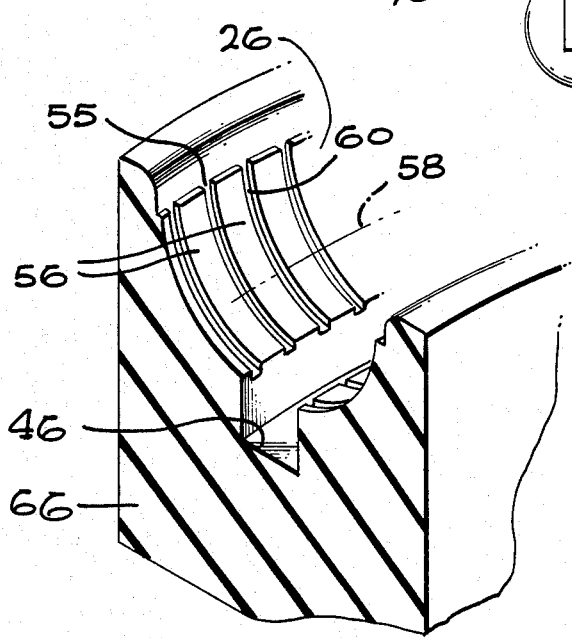

POWER CABLE RETRIEVER

BACKGROUND OF THE INVENTION

Power cables are used at airports to supply electrical power to airplanes when they are on the ground. A common power cable system includes a cable of a length of about 21 meters (69 feet) which extends from a storage bin through a motor-driven retriever located about four meters (12 feet) above the ground, and down along the ground to a connector at the outer end which can plug into a correponding connector on the aircraft. In freezing weather airplanes are commonly sprayed with glycol, an anti-freeze solution to prevent ice buildup. As a result, the ground area around the aircraft becomes coated with the slippery glycol fluid, and cables lying on the ground also pick up considerable fluid. A prior power-driven retriever may include a pair of rubber wheels which rotate about vertical axes and which can grip a power cable between them. The prior power cables have a cross section with numerous bumps caused by various conductors near the periphery of the cable. When the cable becomes covered with slippery anti-freeze fluid, the retrieval mechanism has often slipped on the cable so the cable could not be retracted. A retrieval system which reliably gripped a cable to assure its retrieval even when the cable is covered with a slippery fluid, would be of considerable value.

SUMMARY OF THE INVENTION

In accordance with one embodiment of the present invention, an apparatus is provided which can reliably draw in a power cable even when the cable is covered with a slippery fluid. The apparatus includes a driven traction wheel and means for pressing a cable against the peripheral surface of the wheel. The peripheral surface of the wheel is concavely curved to closely receive the cable. The wheel can be provided with closely spaced treads to engage the cable while fluid drains into the spaces between the treads. The wheel can also include a circumferentially extending groove into which fluid can drain and from which fluid can be drained away.

The cable can be formed with a circular cross section and pressure rollers can be formed with largely semi-circular peripheries for closely surrounding the cable while pressing it against the periphery of the wheel. The rollers can also be provided with circumferentially extending grooves.

The novel features of the invention are set forth with particularity in the appended claims. The invention will be best understood from the following description when read in conjunction with the accompanying drawings.

BRIEF DESCRIPTION OF THE DRAWINGS

FIG. 1 is a partial perspective view of a power cable retriever constructed in accordance with the present invention.

FIG. 2 is a view taken on the line 2—2 of FIG. 1.

FIG. 3 is a partial sectional and perspective view of the traction wheel of FIG. 1.

FIG. 4 is a partial plan view of the traction wheel of FIG. 3.

FIG. 5 is a front elevation view of a portion of the system of FIG. 1, shown in greater detail.

DESCRIPTION OF THE PREFERRED EMBODIMENTS

FIG. 1 illustrates a power cable retriever apparatus 10 for paying out and drawing in an electrical cable 12 from and into a storage bin 14. The apparatus is used at an airport, where a connector 16 at the outer end of the cable can plug into a corresponding connector on an aircraft to deliver electrical power to the craft. The cable 12 is typically about 21 meters (69 feet) long, and the apparatus 10 lies a plurality of meters, such as 4 (12 feet) above the ground.

In cold weather, glycol is often sprayed on the outside of aircraft to prevent the buildup of ice. As a result, there is often a considerable amount of glycol, a slippery fluid, lying on the ground. Since much of the cable drags along the ground as it is being retracted, the cable becomes coated with glycol. It has been found that prior art retrieval devices slipped on the glycol-coated cable because of the slipperyness of the cable and the appreciable height of the apparatus 10 above the ground. A common cable 12 weighs about 2 pounds per foot so if the apparatus 10 is 4 meters above the ground; it must lift about 12 feet of cable as well as drag a considerable length of cable along the ground. The apparatus 10 is constructed to securely grip the cable despite it being heavily coated with glycol or other slippery fluid. The apparatus is also constructed to minimize long term contact of the cable with glycol, which can soften the rubber sheathing on the cable.

The apparatus 10 includes a traction wheel 24 having a peripheral surface 26 for engaging the cable. A motor 30 rotates the traction wheel about a substantially horizontal axis 32 in clockwise and counterclockwise directions to pay out and retrieve the cable. A group of rollers 34, 36, 38 press the cable against the peripheral surface of the traction wheel. A group of four guide rolls 40 loosely guide the cable to a position between the rollers and traction wheel as the cable is pulled up, and allow the cable to orient itself so the "natural" bend of the cable can become aligned with the bending produced by the traction wheel and rollers.

As shown in FIG. 2, the electrical cable 12 is constructed so it has a substantially circular cross section. The peripheral surface 26 of the traction wheel has a radius of curvature R about equal to that of the cable, so that the cable closely nests in the surface of the wheel. Also, each of the pressure rollers such as 34 has a concave periphery 42 which also has a radius of curvature about equal to that of the traction wheel to closely receive the cable, the concave pressure roller surface extending by about one-half of a circle. The pressure roller is spring biased towards the traction wheel, so the cable is squeezed between them, with the roller and wheel each contacting the cable along more than 90°, for a total of well over 180° (preferably at least about 260°). The pressure rollers contact the cable along more than 120°. This results in a "squeegeeing" action whereby much of the glycol on a cable being retrieved is squeegeed off the cable, so that after passing through three pressure rollers, only a small amount of a glycol remains on the cable.

Where the cable picks up a large amount of glycol, it would be possible for large amounts of the glycol to build up on either side of the nips such as 44 (FIG. 1) between each pressure roller and the traction wheel. Applicant avoids such buildup by providing a groove 46 (FIGS. 2 and 3) that extends circumferentially around the traction wheel. The groove 46 provides a low resistance path for the flowing away of the glycol, down to the lowermost location at 50 of the groove, from which the glycol can drip down onto the ground. It may be noted that the groove permits the drainage of glycol which has passed by the presure rollers, and which might otherwise accumulate on the upper side of the nip between the pressure rollers and wheel. Glycol tends to soften the rubber sheathing of the cable when it remains in long term contact with the cable. The drainage of glycol minimizes the amount that remains on the cable at the pressure rollers when the cable is not being moved. The pressure rollers such as 34 are also provided with drainage grooves 51, 53 to avoid the buildup and retention of glycol or other anti-freeze liquid adjacent to the rollers. The groove, especially in the traction wheel, is also useful in receiving and carrying away ice and snow.

The peripheral surface 26 of the traction wheel is formed with a base surface 53 and multiple treads 56 above the base surface and extending primarily perpendicular to the cirumference of the traction wheel as indicated by the imaginary circumferential line 58. Recesses 60 at the level of the base surface, lie in the spaces between the treads, and the recesses preferably connect with the drainage groove 46. The treads and recesses 56, 60 provide adjacent locations of high and low pressure contact with the cable, so that liquid on the cable is squeezed out of the location where a tread contacts a cable, into adjacent recesses. Although the liquid could be allowed to remain in the recesses, the connection of the recesses with the drainage groove 46 facilitates drainage of large quantities of fluid. The treads and recesses should be closely spaced along the circumferential direction, with a circumferential spacing S preferably being less than the diameter of the cable and preferably no more than the radius of curvature R of the cable-engaging surface. A longer spacing between treads and recesses can result in the formation of pockets of liquid where slippage can occur and also can result in the pressure roller applying pressure between the cable and traction wheel at a location where there are no treads and recesses so that the cable can slip at that location. The treads should lie on both sides of the drainage groove 46 to prevent the cable from being pressed against one side of the wheel's peripheral surface along which it can slip.

FIG. 5 illustrates some details of construction of the retrieval apparatus 10. The traction wheel 24 includes a pair of sideplates 62, 64 on opposite sides of a rubber cable-engaging part 66 which forms the cable-engaging surface. The traction wheel is rotatably mounted on a frame 70. The pressure rollers 34, 36, 38 are rotatably mounted on a roller frame 72 which is slideably and pivotably mounted at 74 on the main frame 70. A pair of springs 76, 78 urge the roller frame towards the traction wheel to closely surround a cable 12 between them, with the pressure rollers entering the space between the sideplates 62, 64 of the traction wheel and capable of pressing directly against the opposite sides of the rubber part of the traction wheel.

Applicant has constructed a variety of traction wheels and related mechanisms and tested them to retract a cable of 1.5 inches outside diameter and a weight of about 2 pounds per foot, coated with one pint of a 50% solution of glycol spread over a 60 foot length of cable, with the axis of the traction wheel located 12 feet above the ground and the diameter of the traction wheel (at line 58) being 14 inches. With a slick (untreaded) version of the traction wheel, without a drainage groove, the cables slipped badly on the wheel. In a version where the traction wheel had a drainage groove, improvement was found in that the wheel usually pulled the cable, but considerably slipping of the cable was observed, which could result in wear of the cable and traction wheel. Applicant then used a version of the traction wheel which included not only a drainage groove, but also treads of the type illustrated in the drawings and spaced a distance S of ¼ inch, which engage over 90° of the cross section of the cable. When tested with glycol on the cable, as described above, no slipping was observed. The orientation of the wheel, so it rotates about a vertical axis also helps traction, by causing the weight of the cable to press against the rubber wheel for better gripping. The vertical orientation also results in creating a free length of cable (along the over 2 meters of height between the ground and wheel) along which the cable can orient itself so its natural bend radius is aligned with the curvature of the traction wheel.

Thus, the invention provides an apparatus for drawing in a cable that may be coated with a slippery fluid, which reliably engages the cable to avoid slippage of the cable, while also minimizing deterioration of the cable sheath caused by long term contact with the fluid. The apparatus includes a traction wheel with a concave peripheral surface for closely engaging the cable and with pressure rollers for pressing the cable against the surface. The cable is formed so that it is of circular cross section along almost its entire length, and the periphery of the traction wheel is formed substantially circularly concave so the cable can closely nest in it, with a pressure roller also being concave so the cable can closely nest within it. This results in the squeegeeing of the cable to remove fluid from it. The traction wheel is formed with multiple closely spaced treads and recesses and has a circumferentially extending groove for draining displaced fluid.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. Apparatus for use at an airport for drawing in and paying out an electrical cable of substantially circular cross section, into and from an opening of a storage bin that lies high above the ground so the outer end of the cable can be pulled to an aircraft on the ground to supply electricity thereto and the cable then drawn in, where the ground may be covered with an anti-freeze liquid, comprising:

a cable-engaging traction wheel rotatably mounted above the ground about a substantially horizontal axis;

means for turning said wheel;

means for pressing a cable against said wheel said wheel having a cable-engaging periphery of elastomeric material, a peripheral region of semi-circular cross section, as taken on the diameter of the wheel, of about the same radius as said cable for closely receiving said cable, and said wheel having a plurality of recesses in said cable-engaging surface forming treads between said recesses, said recesses extending primarily perpendicular to the wheel periphery, and said recesses spaced apart along the periphery of said wheel by no more than about the diameter of said semi-crcular cross section of said wheel, whereby to eliminate pockets of the liquid between the cable and wheel.

2. The apparatus described in claim 1 wherein:
said wheel forms a groove extending along the circumference of the wheel and said recesses communicate with said groove even when a cable lies over the recesses, whereby to drain away liquid.

3. Apparatus for drawing in a cable which has a largely circular cross section and that may be coated with a slippery fluid comprising:
a traction wheel rotatably mounted about a primarily horizontal axis and having a peripheral surface for engaging said cable;
at least one rotatable pressure roller and means for biasing the pressure roller against a cable that is engaged with said traction wheel;
means for rotating said traction wheel;
said peripheral surface of said traction wheel being concave, with a radius of curvature about the same as said cable to closely receive it, said peripheral surface including a groove extending in a circumferential direction around said surface of the wheel, with the bottom of said wheel along said grooe being unobstructed to allow fluid to drain off the wheel thereat;
said pressure roller having a concave periphery which closely receives said cable, said pressure roller concave periphery extending about one-half of a circle about said cable, whereby to squeegee off fluid on the side of the cable opposite the traction wheel;
said pressure roller being an idler roller which is driven only by movement of said traction wheel and any cable between said traction wheel and the pressure roller.

4. The apparatus described in claim 3 wherein:
said pressure roller includes a circumferential groove, whereby to enable drainage of fluid past the roller.

5. Apparatus for drawing in a cable which has a largely circular cross section and that may be coated with a slippery fluid comprising:
a traction wheel rotatable mounted about a primarily horizontal axis and having a peripheral surface for engaging said cable;
at least one rotatable pressure roller and means for biasing the pressure roller against a cable that is engaged with said traction wheel;
means for rotating said traction wheel;
said peripheral surface of said traction wheel being concave, with a radius of curvature about the same as said cable to closely receive it, said peripheral surface including a groove extending in a circumferential direction around said surface of the wheel, with the bottom of said wheel along said groove being unobstructed to allow fluid to drain off the wheel thereat;
said peripheral surface includes a base surface and a multiplicity of treads spaced largely around the periphery of the traction wheel and separated by recesses, so the treads directly engage the cable, said treads spaced apart along the periphery of the wheel by less than the radius of curvature of said peripheral surface and said recesses leading to said groove, whereby to allow good fluid drainage.

6. Apparatus for drawing in and paying out a cable of largely circular cross section into and from a storage area lying high above the ground, so the outer end of the cable can be pulled out and may lie on the ground where the ground may be covered with a slippery liquid, and so the cable with such liquid thereon can be drawn in, comprising:
a cable-engaging traction wheel rotatably mounted above the ground, with the traction wheel lying above the ground;
a first pressure roller biased towards said traction wheel to press a cable against the traction wheel, substantially at a location where said cable first engages the traction wheel as the cable is pulled up off the ground;
a motor coupled to the traction wheel to turn it;
said traction wheel and pressure roller each being rotatably mounted bout a corresponding substantially horizontal axis, and the peripheries of said wheel and roller each being concave and closely surrounding said cable, whereby to sequeegee off fluid picked up by the cable, as the cable is being drawn in and allow some of the squeegeed-off fluid to rapidly fall along a substantial length of a largely vertical cable portion;
said traction wheel including a cable-engaging surface and a multiplicity of recesses in said surface, said recesses extending substantially perpendicular to a direction around the periphery of the traction wheel, said cable having a diameter and said recesses being spaced apart by less than half the diameter of the cable, said traction wheel also having a groove extending around its circumference and said recesses communicating with said groove to flow fluid from the recesses to said groove.

* * * * *